US012649679B2

(12) United States Patent
Olbert et al.

(10) Patent No.: US 12,649,679 B2
(45) Date of Patent: Jun. 9, 2026

(54) HOLLOW SPHERICAL GLASS PARTICLES

(71) Applicant: OMYA INTERNATIONAL AG, Oftringen (CH)

(72) Inventors: Gerhard Olbert, Ludwigshafen am Rhein (DE); Laila Raquel Pasin E Matos, Ludwigshafen am Rhein (DE)

(73) Assignee: OMYA INTERNATIONAL AG, Oftringen (CH)

( * ) Notice: Subject to any disclaimer, the term of this patent is extended or adjusted under 35 U.S.C. 154(b) by 741 days.

(21) Appl. No.: 17/263,429

(22) PCT Filed: Jul. 24, 2019

(86) PCT No.: PCT/EP2019/069865
§ 371 (c)(1),
(2) Date: Jan. 26, 2021

(87) PCT Pub. No.: WO2020/020921
PCT Pub. Date: Jan. 30, 2020

(65) Prior Publication Data
US 2021/0284563 A1 Sep. 16, 2021

(30) Foreign Application Priority Data
Jul. 26, 2018 (EP) ..................................... 18185918

(51) Int. Cl.
*C03B 9/30* (2006.01)
*C03B 19/10* (2006.01)
(Continued)

(52) U.S. Cl.
CPC .............. *C03B 9/30* (2013.01); *C03B 19/107* (2013.01); *C03C 3/083* (2013.01); *C03C 11/002* (2013.01)

(58) Field of Classification Search
CPC ..... C03B 19/1025; C03B 19/10; C03B 19/08; C03B 19/107; C03B 19/108;
(Continued)

(56) References Cited

U.S. PATENT DOCUMENTS 2,431,884 A * 12/1947 Neuschotz ............ C04B 20/066
432/13
2,947,115 A * 8/1960 Wood ................... C03B 19/1025
425/332
(Continued)

FOREIGN PATENT DOCUMENTS

AT 15001 U1 * 8/2016 ............. C04B 14/18
AU 05813/28 B2 2/1989
(Continued)

OTHER PUBLICATIONS

European Search Report for EP Patent Application No. 18185918.2, Issued on Nov. 9, 2018, 3 pages.
(Continued)

*Primary Examiner* — Erin Snelting
*Assistant Examiner* — Steven S Lee
(74) *Attorney, Agent, or Firm* — ALGM LLP; Harry J. Guttman

(57) ABSTRACT

The present invention is directed to hollow aluminosilicate glass particles and a process for the production thereof. Further, the present invention is directed to an article comprising said hollow aluminosilicate glass particles as well as the use of said particles as a filler for high temperature products, molten metal, injection moulded synthetic materials, flame-retardant insulating foams, cement slurries, mortars, concretes and oil field applications.

21 Claims, 2 Drawing Sheets

(51) Int. Cl.
*C03C 3/083* (2006.01)
*C03C 11/00* (2006.01)

(58) Field of Classification Search
CPC ..... C03B 438/009; C03B 9/30; C03C 11/002;
C03C 19/107; C03C 3/083; C03C 3/062;
C03C 3/00; C03C 19/00; C03C 19/01;
B01J 13/02; B01J 13/04; F27B 1/00
See application file for complete search history.

(56) References Cited

U.S. PATENT DOCUMENTS

| | | | | |
|---|---|---|---|---|
| 2,978,339 A | * | 4/1961 | Alford | C08J 9/32 |
| | | | | 432/13 |
| 3,230,064 A | * | 1/1966 | Veatch | C03B 19/1075 |
| | | | | 65/141 |
| 3,361,549 A | * | 1/1968 | Nakajima | C03B 19/1025 |
| | | | | 65/141 |
| 3,699,050 A | | 10/1972 | Henderson | |
| 3,838,998 A | * | 10/1974 | Matthews | C03B 19/1075 |
| | | | | 501/39 |
| 4,017,290 A | * | 4/1977 | Budrick | C03B 19/1075 |
| | | | | 264/43 |
| 4,046,548 A | * | 9/1977 | Wood | C03B 19/1025 |
| | | | | 432/223 |
| 4,111,713 A | * | 9/1978 | Beck | B63B 3/13 |
| | | | | 428/404 |
| 4,133,854 A | * | 1/1979 | Hendricks | C03B 19/1055 |
| | | | | 376/916 |
| 4,257,798 A | * | 3/1981 | Hendricks | C03C 11/002 |
| | | | | 264/43 |
| 4,303,431 A | * | 12/1981 | Torobin | C03C 11/002 |
| | | | | 425/7 |
| 4,336,338 A | | 6/1982 | Downs et al. | |
| 4,391,646 A | | 7/1983 | Howell | |
| 4,400,191 A | * | 8/1983 | Youngberg | B01J 2/04 |
| | | | | 376/916 |
| 4,448,599 A | * | 5/1984 | Mackenzie | C03B 19/107 |
| | | | | 501/39 |
| 4,475,936 A | | 10/1984 | Aston et al. | |
| 4,487,620 A | * | 12/1984 | Neusy | C03B 19/1025 |
| | | | | 65/142 |
| 4,519,777 A | * | 5/1985 | Akhtyamov | C04B 20/066 |
| | | | | 432/13 |
| 4,602,962 A | * | 7/1986 | Fehlmann | C03B 19/1085 |
| | | | | 501/84 |
| 4,693,739 A | | 9/1987 | Manabe et al. | |
| 4,698,317 A | * | 10/1987 | Inoue | B01J 20/16 |
| | | | | 501/39 |
| 4,767,726 A | * | 8/1988 | Marshall | C03C 11/002 |
| | | | | 501/39 |
| 4,778,502 A | | 10/1988 | Garnier et al. | |
| 4,789,501 A | * | 12/1988 | Day | C03C 3/062 |
| | | | | 424/1.61 |
| 4,801,411 A | * | 1/1989 | Wellinghoff | B01J 13/0095 |
| | | | | 264/9 |
| 5,002,696 A | * | 3/1991 | White | F27D 3/0033 |
| | | | | 252/378 R |
| 5,004,488 A | | 4/1991 | Mehrotra et al. | |
| 5,176,732 A | | 1/1993 | Block et al. | |
| 5,611,833 A | * | 3/1997 | Brahmbhatt | C03B 19/1025 |
| | | | | 65/142 |
| 5,849,055 A | * | 12/1998 | Arai | C03B 19/1025 |
| | | | | 501/84 |
| 6,221,326 B1 | | 4/2001 | Amiche | |
| 6,245,700 B1 | | 6/2001 | Budd et al. | |
| 6,360,563 B1 | | 3/2002 | Gerhardt et al. | |
| 6,531,222 B1 | | 3/2003 | Tanaka et al. | |
| 7,666,505 B2 | * | 2/2010 | Datta | C04B 28/02 |
| | | | | 501/6 |
| 8,058,320 B2 | | 11/2011 | Ejiri et al. | |
| 9,040,157 B2 | | 5/2015 | Hao et al. | |
| 9,321,906 B2 | | 4/2016 | Takeishi et al. | |

| | | | | |
|---|---|---|---|---|
| 2001/0043996 A1 | | 11/2001 | Yamada et al. | |
| 2002/0004111 A1 | | 1/2002 | Matsubara et al. | |
| 2002/0045146 A1 | * | 4/2002 | Wang | H01L 21/67109 |
| | | | | 432/49 |
| 2002/0121108 A1 | * | 9/2002 | Streicher | C03B 19/1025 |
| | | | | 65/21.3 |
| 2006/0084724 A1 | * | 4/2006 | Senturk | C03C 11/00 |
| | | | | 106/482 |
| 2006/0122049 A1 | * | 6/2006 | Marshall | C03B 19/107 |
| | | | | 501/27 |
| 2008/0096018 A1 | * | 4/2008 | Zhang | C03C 10/00 |
| | | | | 65/21.4 |
| 2010/0204342 A1 | | 8/2010 | Kawasaki et al. | |
| 2011/0152056 A1 | * | 6/2011 | Qi | C03B 19/107 |
| | | | | 501/39 |
| 2011/0265408 A1 | | 11/2011 | Jha et al. | |
| 2013/0291590 A1 | * | 11/2013 | Qi | C03B 19/107 |
| | | | | 65/142 |
| 2014/0249058 A1 | | 9/2014 | Wu et al. | |
| 2014/0291582 A1 | * | 10/2014 | Brunnmair | F27B 1/26 |
| | | | | 432/245 |
| 2015/0059407 A1 | | 3/2015 | Lehmann et al. | |
| 2015/0132576 A1 | | 5/2015 | Qi | |
| 2015/0315075 A1 | | 11/2015 | Pham et al. | |
| 2016/0152513 A1 | * | 6/2016 | Morris | C03B 19/107 |
| | | | | 501/39 |
| 2016/0221856 A1 | * | 8/2016 | Dennert | C03B 19/1075 |
| 2017/0174561 A1 | * | 6/2017 | Isaev | C03C 3/085 |
| 2019/0135675 A1 | | 5/2019 | Neidhardt | |
| 2019/0337838 A1 | | 11/2019 | Isaev | |

FOREIGN PATENT DOCUMENTS

| | | | | |
|---|---|---|---|---|
| CN | 86104731 A | | 1/1987 | |
| CN | 1017888 B | | 8/1992 | |
| CN | 1216565 A | | 5/1999 | |
| CN | 101296874 A | | 10/2008 | |
| CN | 101679049 A | | 3/2010 | |
| CN | 101704632 A | | 5/2010 | |
| CN | 102459503 A | | 5/2012 | |
| CN | 102583973 A | | 7/2012 | |
| CN | 104520245 A | | 4/2015 | |
| CN | 105236947 A | | 1/2016 | |
| CN | 108191219 A | | 6/2018 | |
| DE | 19937861 A1 | | 2/2001 | |
| DE | 102015209516 A1 | * | 12/2016 | C04B 38/009 |
| EP | 0601594 A1 | * | 6/1994 | B01J 2/02 |
| EP | 0858434 B1 | | 2/2002 | |
| EP | 3184494 A1 | | 6/2017 | |
| GB | 2178024 A | | 2/1987 | |
| JP | 58-156551 A | | 9/1983 | |
| JP | H0277768 A | | 3/1990 | |
| JP | 07-277768 A | | 10/1995 | |
| JP | 3579966 B2 | | 10/2004 | |
| JP | 2007051019 A | * | 3/2007 | C03B 19/102 |
| JP | 2014510011 A | | 4/2014 | |
| JP | 2015-206102 A | | 11/2015 | |
| TW | 201630838 A | | 9/2016 | |
| WO | 97/42127 A1 | | 11/1997 | |
| WO | 2007/102569 A1 | | 9/2007 | |
| WO | 2012/134679 A2 | | 10/2012 | |
| WO | 2014/199241 A1 | | 12/2014 | |
| WO | WO-2017040900 A1 | * | 3/2017 | C03C 3/089 |
| WO | 2017/108831 A1 | | 6/2017 | |
| WO | 2020/020921 A1 | | 1/2020 | |

OTHER PUBLICATIONS

International Preliminary Report on Patentability received for PCT Patent Application No. PCT/EP2019/069865, mailed on Feb. 4, 2021, 8 pages.

International Search Report and Written Opinion received for PCT Patent Application No. PCT/EP2019/069865, mailed on Sep. 26, 2019, 9 pages.

3M(Trademark) Glass Bubbles—K Series, S Series and iM Series, Product Information—3M, 2013, 4 pages.

(56) References Cited

OTHER PUBLICATIONS

Al-Gemeel, et al., "Use of hollow glass microspheres and hybrid fibres to improve the mechanical properties of engineered cementitious composite", Construction and Building Materials, vol. 171, 2018, pp. 858-870.

Davies, et al., "Chapter 10—Failure of polymer matrix composites in marine and off-shore applications", Failure Mechanisms in Polymer Matrix Composites, 2012, pp. 300-336.

Sung, et al., "A Study on the Fabrication of Hollow Glass Sphere Using Precursor Particles Prepared by Spray Drying Method", Hwahak Konghak, vol. 38, No. 4, 2000, 497-502.

International Preliminary Report on Patentability received for PCT Patent Application No. PCT/EP2021/050570, mailed on Apr. 6, 2022, 12 pages.

International Search Report and Written Opinion received for PCT Patent Application No. PCT/EP2021/050570, mailed on Apr. 8, 2021, 10 pages.

International Search Report received for PCT Patent Application No. PCT/EP2020/051743, mailed on Oct. 12, 2020, 3 pages.

U.S. Appl. No. 17/793,987 PatentCenter from Jul. 20, 2022 to Mar. 11, 2025, 297 pages.

U.S. Appl. No. 17/793,987 PatentCenter from Apr. 22, 2025 to Jan. 21, 2026, 198 pages.

* cited by examiner

HOLLOW SPHERICAL GLASS PARTICLES

CROSS-REFERENCE TO RELATED APPLICATIONS

This application is a national stage application (under 35 U.S.C. § 371) of PCT/EP2019/069865, filed Jul. 24, 2019, which claims benefit of European Application No. 18185918.2, filed Jul. 26, 2018, both of which are incorporated herein by reference in their entirety.

The present invention is directed to hollow aluminosilicate glass particles and a process for the production thereof. Further, the present invention is directed to an article comprising said hollow aluminosilicate glass particles as well as the use of said particles as a filler for high temperature products, molten metal, injection moulded synthetic materials, flame-retardant insulating foams, cement slurries, mortars, concretes and oil field applications.

Hollow spherical glass particles, also known as hollow glass microspheres, are used as fillers for materials in various fields of application. The specific gravity of hollow spherical glass particles is significantly lower compared with other fillers while the physical properties such as heat resistance, pressure resistance and impact resistance remain on a high level. Therefore, hollow spherical glass particles are widely used fillers for weight-reduced articles containing molded resin or metal components, e.g. automotive parts, household articles, sealing materials or construction materials.

The methods known in the art for producing hollow spherical glass particles usually involve the dispersion of a dried fine glass powder in a hot air of high temperature, wherein the glass is heated so that the viscosity of the glass decreases. At the same time, a gas is formed by heat decomposition of a foaming agent. Accordingly, due to the surface tension, the shape of the resulting particles will be spherical and at the same time, the particles will be hollow due to the gas formed in the particles.

Regarding the chemical composition of the hollow spherical glass particles, borosilicate glass is widely used due to its superior chemical and mechanical resistance. For instance, JP-A-58-156551 discloses a process for forming hollow borosilicate glass microspheres from starting materials such as $SiO_2$, $H_3BO_3$, $CaCO_3$, $Na_2CO_3$, $NH_4H_2PO_4$ and $Na_2SO_4$. However, the application of boric acid as starting material can result in the formation of toxic compounds during the production process of the hollow spherical glass particles. According to current EU legislation (REACH), boric acid and boric acid esters have been classified as harmful to health. Preparations shall therefore be labeled as toxic with the hazard statement "May impair procreation" starting at a boron content of 1%. Due to these increasing requirements and to avoid hazards during the process, the application of boron-free starting materials is preferred.

WO 2017/108831 discloses a method for the preparation of hollow spherical alumosilicate glass particles using $Al_2O_3$, $SiO_2$ and at least one alkali metal oxide as starting materials. Accordingly, the resulting hollow spherical glass particles are free of boron and a particle size in the range of 10 to 600 μm is disclosed, but the diameter of the particles obtained according to WO 2017/108831 is at least 80 μm and the wall thickness is rather inhomogenous which has a deteriorating effect on the mechanical properties of the particles. Further, particles having a size of 80 μm or above are not suitable as fillers for articles having a more refined surface structure or in case excellent haptic properties of the filled article are desired.

Accordingly, there is a need in the art for boron-free hollow spherical glass particles featured by improved mechanical properties.

Therefore, it is an object of the present invention to provide boron-free hollow spherical glass particles having a small particle diameter and a homogenous wall thickness as well as a process for the preparation of said hollow spherical glass particles.

The foregoing and other objects are solved by the subject-matter of the present invention.

According to a first aspect of the present invention, a hollow spherical glass particle comprising a spherical glass shell defining a hollow interior is provided, said hollow spherical glass particle comprising i) at least 30 wt.-% of $Al_2O_3$,
    ii) at least 35 wt.-% of $SiO_2$, and
    iii) at least 18 wt.-% of at least one alkali metal oxide,
    based on the overall weight of the hollow spherical glass particle,
    wherein the hollow spherical glass particle has a particle diameter in the range of more than 20 to 75 μm,
    and wherein the hollow spherical glass particle is free of boron.

It was surprisingly found by the inventors that hollow spherical glass particles having a diameter in the range of more than 20 to 75 μm can be obtained from a starting material composition comprising $Al_2O_3$, $SiO_2$ and at least one alkali metal oxide. Particles of this size can be applied for articles having a more refined surface structure.

It is especially preferred that the hollow spherical glass particle has a particle diameter in the range of more than 20 to 70 μm.

According to one embodiment of the present invention, the at least one alkali metal is selected from $Na_2O$, $K_2O$ or mixtures thereof. In particular, it is preferred that the at least one alkali metal oxide is a mixture of $Na_2O$ and $K_2O$.

According to another embodiment of the present invention, the weight ratio between $Na_2O$ and $K_2O$ is in the range of 10:1 to 30:1.

According to a further embodiment the ratio between the particle diameter [in μm] and the wall thickness [in μm] is in the range of 10 to 30, more preferably in the range of 15 to 25, still more preferably in the range of 17 to 23, like in the range of 20 to 22. Without being bound to theory, a ratio between the particle diameter and the wall thickness within said range improves the mechanical stability of the hollow spherical glass particle.

Accordingly, it is preferred that the hollow spherical glass particle according to the present invention has a wall thickness in the range of 0.1 to 15 μm, more preferably in the range of 0.2 to 12 μm, still more preferably in the range of 1.5 to 10 μm, like in the range of 0.3 to 7.0 μm. A wall thickness in this range is also advantageous for the mechanical properties.

It is especially preferred that the hollow spherical glass particle comprises i) 30 to 45 wt.-% of $Al_2O_3$,
    ii) 35 to 42 wt.-% of $SiO_2$, and
    iii) 18 to 30 wt.-% of a mixture of $Na_2O$ and $K_2O$,
    based on the overall weight of the hollow spherical glass particle.

According to one embodiment of the present invention, the hollow spherical glass particle has a pressure collapse strength value in the range of 120 to 150 MPa. The method for determining the pressure collapse strength value is described in more detail below.

The present invention is further directed to a plurality of hollow spherical glass particles as defined above.

It is especially preferred that the plurality of hollow spherical glass particles has an average particle diameter (D50) in the range of more than 20 to 75 μm.

The present invention is also directed to a process for the preparation of hollow spherical glass particles, comprising the steps of a) providing a composition comprising
   i) at least 30 wt.-% of $Al_2O_3$,
   ii) at least 35 wt.-% of $SiO_2$, and
   iii) at least 18 wt.-% of at least one alkali metal oxide, based on the overall weight of the composition, b) optionally subjecting the composition obtained in step a) to a grinding process such that finely ground particles having a particle size of 10.0 μm or below are obtained, c) mixing the finely ground particles obtained in step b) with water and optionally an organic binder, thereby obtaining a slurry, d) spray-drying the slurry obtained in step c), and e1) feeding the particles obtained in step d) into a heating device such that the particles are blown upwards while the temperature is maintained above 1000° C., thereby obtaining the hollow spherical glass particles, or e2) feeding the particles obtained in step d) into a heating system comprising at least two heating devices connected in series such that the particles pass through the first heating device and are continuously transferred into the subsequent heating devices while the temperature in the heating devices is maintained above 1000° C., thereby obtaining the hollow spherical glass particles, or e3) feeding the particles obtained in step d) into at least one heating device such that the particles pass through the heating device while the temperature in the heating devices is maintained above 1000° C. and at least a part of the thus obtained particles is transferred back into the heating device such that the particles pass through the heating device, thereby obtaining the hollow spherical glass particles.

According to one embodiment of the present invention, the finely ground particles obtained in step b) contain a first fraction of particles having a particle size in the range of 1.0 to 10.0 μm, preferably in the range of 1.0 to 7.0 μm and a second fraction of particles having a particle size of 1.0 μm or below.

According to another embodiment of the present invention, the organic binder is a higher hydric alcohol.

It is especially preferred that the hollow spherical glass particles obtained according to the process are hollow spherical glass particles as described above.

The present invention is further directed to an article, comprising the plurality of hollow spherical glass particles as described above.

Preferably, said article is a high temperature product, an injection moulded synthetic material, a flame-retardant insulating foam, a cement slurry, a mortar or concrete.

The present invention is also directed to the use of the plurality of hollow spherical glass particles described above as a filler for high temperature products, molten metal, injection moulded synthetic materials, flame-retardant insulating foams, cement slurries, mortars, concretes and oil field applications.

In the following, the present invention is described in more detail.

Figure 3:
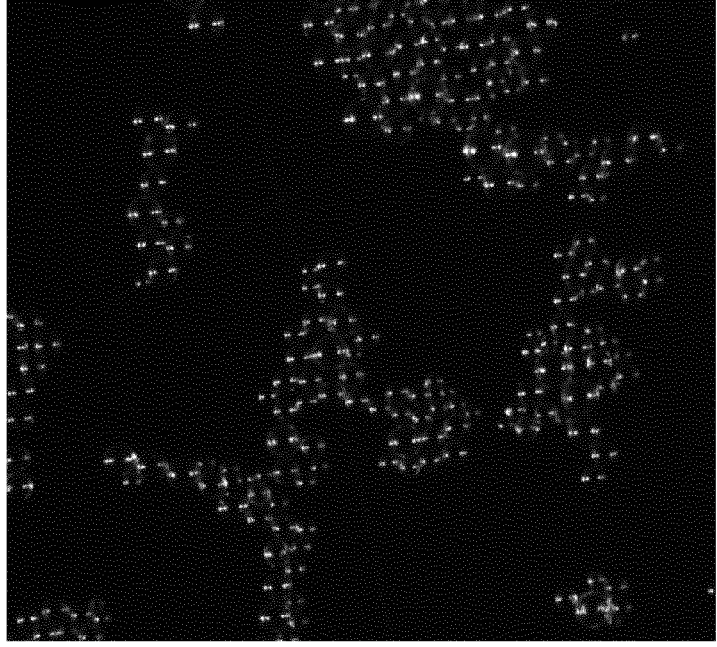

FIG. 3 (FIG. 3) depicts the microscopic picture of the particles after flotation separation. The present invention provides hollow spherical alumosilicate glass particles which are hollow glass microspheres having an average particle size in the range of more than 20 to 75 μm. As outlined above, the hollow spherical glass particles according to the present invention comprise $Al_2O_3$, $SiO_2$ and at least one alkali metal oxide.

In particular, the inventive hollow spherical glass particle comprises at least 30 wt.-%, preferably 30 to 45 wt.-%, more preferably 33 to 40 wt.-%, still more preferably 35 to 38 wt.-% of $Al_2O_3$, at least 35 wt.-%, preferably 35 to 55 wt.-%, more preferably 40 to 46 wt.-%, still more preferably 41 to 42 wt.-% of $SiO_2$, and at least 18 wt.-%, preferably 18 to 30 wt.-%, more preferably 20 to 24 wt.-%, still more preferably 21 to 23 wt.-% of the at least one alkali metal oxide, based on the overall weight of the hollow spherical glass particle.

Preferably, the hollow spherical glass particle comprises at least two alkali metal oxides selected from the group consisting of $Li_2O$, $Na_2O$ and $K_2O$.

It is especially preferred that the at least one alkali metal oxide within the hollow spherical glass particle is a mixture of $Na_2O$ and $K_2O$.

Accordingly, it is preferred that the inventive hollow spherical glass particle comprises at least 30 wt.-%, preferably 30 to 45 wt.-%, more preferably 33 to 40 wt.-%, still more preferably 35 to 38 wt.-% of $Al_2O_3$, at least 35 wt.-%, preferably 35 to 55 wt.-%, more preferably 40 to 46 wt.-%, still more preferably 41 to 42 wt.-% of $SiO_2$, and at least 18 wt.-%, preferably 18 to 30 wt.-%, more preferably 20 to 24 wt.-%, still more preferably 21 to 23 wt.-% of a mixture of $Na_2O$ and $K_2O$, based on the overall weight of the hollow spherical glass particle.

Preferably, the weight ratio between $Na_2O$ and $K_2O$ within said mixture is in the range of 10:1 to 30:1, more preferably in the range of 15:1 to 25:1, still more preferably in the range of 18:1 to 22:1, like in the range of 20:1 to 21:1.

Accordingly, it is preferred that the inventive hollow spherical glass particle comprises at least 30 wt.-%, preferably 30 to 45 wt.-%, more preferably 33 to 40 wt.-%, still more preferably 35 to 38 wt.-% of $Al_2O_3$, at least 35 wt.-%, preferably 35 to 55 wt.-%, more preferably 40 to 46 wt.-%, still more preferably 41 to 42 wt.-% of $SiO_2$, at least 10 wt.-%, preferably 10 to 30 wt.-%, more preferably 15 to 24 wt.-%, still more preferably 18 to 23 wt.-% of $Na_2O$ and at least 0.5 wt.-%, more preferably 0.5 to 5 wt.-%, still more preferably 1.0 to 2.0 wt.-% of $K_2O$, based on the overall weight of the hollow spherical glass particle.

As outlined above, it is an object of the present invention to provide hollow spherical glass particles which are free of boron. Accordingly, the inventive hollow spherical glass particle is free of boron.

As used herein, the term "free of boron" or "boron-free" is related to a composition or material comprising boron in amounts outside the detection limit of usual determination methods. In particular, it is preferred that the hollow spherical glass particle comprises boron in an amount equal or below 1.0 wt.-%, more preferably equal or below 0.1 wt.-%, still more preferably equal or below 0.01 wt.-%, like equal or below 0.001 wt.-%, based on the overall weight of the hollow spherical glass particle.

Although the inventive hollow spherical glass particle must contain $Al_2O_3$, $SiO_2$ and at least one alkali metal oxide in amounts as indicated above, the starting material for the inventive hollow spherical glass particles is not limited to any particular source. Any starting composition providing $Al_2O_3$, $SiO_2$ and at least one alkali metal oxide in amounts as indicated above is suitable. Suitable starting materials may be selected from zeolites, clays, mica or mixtures thereof. Preferably, the starting material is a zeolite.

Additionally or alternatively to the previous paragraph, it is preferred that no compounds containing boron are used for the preparation of the hollow spherical glass particle.

According to one embodiment of the present invention, the inventive hollow spherical glass particle has a particle size in the range of more than 20 to 70 μm, more preferably in the range of 21 to 50 μm, still more preferably in the range of 22 to 45 μm, like in the range of 23 to 38 μm.

According to another embodiment of the present invention, the inventive hollow spherical glass particle has a particle size in the range of more than 20 to 60 μm, more preferably in the range of 21 to 55 μm, still more preferably in the range of 22 to 43 μm, like in the range of 23 to 35 μm.

According to a further embodiment of the present invention, the inventive hollow spherical glass particle has a particle size in the range of more than 20 to 50 μm, more preferably in the range of 21 to 47 μm, still more preferably in the range of 22 to 41 μm, like in the range of 23 to 32 μm.

According to still another embodiment of the present invention, the inventive hollow spherical glass particle has a particle size in the range of more than 20 to 40 μm, more preferably in the range of 21 to 44 μm, still more preferably in the range of 22 to 31 μm, like in the range of 23 to 29 μm.

According to another embodiment of the present invention, the inventive hollow spherical glass particle has a particle size in the range of more than 20 to 30 μm, more preferably in the range of 21 to 28 μm, still more preferably in the range of 22 to 26 μm, like in the range of 23 to 25 μm.

It is preferred that the hollow spherical glass particle according to the present invention has a wall thickness in the range of 0.1 to 15 μm, more preferably in the range of 0.2 to 12 μm, still more preferably in the range of 1.5 to 10 μm, like in the range of 0.3 to 7.0 μm. Such a wall thickness provides an enhanced mechanical stability. As a result, the hollow spherical glass particle may advantageously be used for construction articles for indoor and outdoor applications such as windowsills, door panels and the like.

Additionally or alternatively to the previous paragraph, it is preferred that the ratio between the particle diameter [in μm] and the wall thickness [in μm] of the hollow spherical glass particle according to the invention is in the range of 10 to 30, more preferably in the range of 15 to 25, still more preferably in the range of 17 to 23, like in the range of 20 to 22.

According to one embodiment of the present invention, the inventive hollow spherical glass particle has a particle size in the range of more than 20 to 70 μm, more preferably in the range of 21 to 50 μm, still more preferably in the range of 22 to 45 μm, like in the range of 23 to 38 μm and a wall thickness in the range of 0.1 to 15 μm, more preferably in the range of 0.2 to 12 μm, still more preferably in the range of 1.5 to 10 μm, like in the range of 0.3 to 7.0 μm.

According to another embodiment of the present invention, the inventive hollow spherical glass particle has a particle size in the range of more than 20 to 60 μm, more preferably in the range of 21 to 55 μm, still more preferably in the range of 22 to 43 μm, like in the range of 23 to 35 μm and a wall thickness in the range of 0.1 to 15 μm, more preferably in the range of 0.2 to 12 μm, still more preferably in the range of 1.5 to 10 μm, like in the range of 0.3 to 7.0 μm.

According to a further embodiment of the present invention, the inventive hollow spherical glass particle has a particle size in the range of more than 20 to 50 μm, more preferably in the range of 21 to 47 μm, still more preferably in the range of 22 to 41 μm, like in the range of 23 to 32 μm and a wall thickness in the range of 0.1 to 15 μm, more preferably in the range of 0.2 to 12 μm, still more preferably in the range of 1.5 to 10 μm, like in the range of 0.3 to 7.0 μm.

According to still another embodiment of the present invention, the inventive hollow spherical glass particle has a particle size in the range of more than 20 to 40 μm, more preferably in the range of 21 to 44 μm, still more preferably in the range of 22 to 31 μm, like in the range of 23 to 29 μm and a wall thickness in the range of 0.1 to 15 μm, more preferably in the range of 0.2 to 12 μm, still more preferably in the range of 1.5 to 10 μm, like in the range of 0.3 to 7.0 μm.

According to another embodiment of the present invention, the inventive hollow spherical glass particle has a particle size in the range of more than 20 to 30 μm, more preferably in the range of 21 to 28 μm, still more preferably in the range of 22 to 26 μm, like in the range of 23 to 25 μm and a wall thickness in the range of 0.1 to 15 μm, more preferably in the range of 0.2 to 12 μm, still more preferably in the range of 1.5 to 10 μm, like in the range of 0.3 to 7.0 μm.

Further, it is preferred that the hollow spherical glass particle according to the present invention has a pressure collapse strength value in the range of 120 to 150 MPa, more preferably in the range of 125 to 140 MPa, still more preferably in the range of 130 to 135 MPa.

For the determination of the pressure collapse strength value, hollow spherical glass particles are transferred into a cylinder which is closed at the bottom and can be subjected to pressure on top by means of a punch. The hollow spherical glass particles are pressed by the punch as in a press. The filling height of the hollow spherical glass particles in the cylinder depends on the particle size. The cylinder is located in a tensile-/compression testing device controlling the force of the punch. Accordingly, a defined normal force or surface pressure is generated. The results are evaluated by determining the percentage of hollow spherical glass particles which have been destroyed by means of microscopy or macroscopy depending on the particle size. The cylinder used for the procedure has an inner diameter of 20 mm and a cylindrical inside length of 80 mm. The filling height was 20 mm. The criterion was based on 80% intact hollow spherical glass particles of the appropriate diameter.

The hollow spherical glass particle should be applicable as a filler for high temperature products, molten metal, injection moulded synthetic materials and flame-retardant insulating foams. Thus, the hollow spherical glass particle should be able to withstand the conditions for the production of said articles. Accordingly, it is preferred that the hollow spherical glass particle according to the present invention has a melting temperature of at least 800° C., more preferably at least 1000° C., still more preferably at least 1200° C., like at least 1400° C. A melting temperature in this range also allows the application of the hollow spherical glass particle in oil field applications.

The present invention is also directed to a plurality of hollow spherical glass particles as described above.

The above mentioned ranges for the particle diameter of the hollow spherical glass particle apply accordingly for the plurality of hollow spherical glass particles. For the plurality of hollow spherical glass particles, said particle diameters represent average values.

Preferably, the above mentioned ranges for the particle diameters represent D10 values, i.e. 10% of the plurality of hollow spherical glass particles fulfils the above mentioned requirements regarding the particle diameter.

More preferably, the above mentioned ranges for the particle diameters represent D50 values, i.e. 50% of the plurality of hollow spherical glass particles fulfils the above mentioned requirements regarding the particle diameter.

Most preferably, the above mentioned ranges for the particle diameters represent D90 values, i.e. 90% of the plurality of hollow spherical glass particles fulfils the above mentioned requirements regarding the particle diameter.

Preferably, said plurality of hollow spherical glass particles has a density in the range of 0.4 to 1.2 $g/cm^3$, more preferably in the range of 0.5 to 1.0 $g/cm^3$, still more preferably in the range of 0.6 to 0.9 $g/cm^3$, like in the range of 0.7 to 0.8 $g/cm^3$.

The present invention is also directed to a process for the preparation of hollow spherical glass particles.

According to step a) of the inventive process, a composition is provided, said composition comprising i) at least 30 wt.-% of $Al_2O_3$, ii) at least 35 wt.-% of $SiO_2$, and iii) at least 18 wt.-% of at least one alkali metal oxide, based on the overall weight of the composition.

In particular, the composition comprises at least 30 wt.-%, preferably 30 to 45 wt.-%, more preferably 33 to 40 wt.-%, still more preferably 35 to 38 wt.-% of $Al_2O_3$, at least 35 wt.-%, preferably 35 to 55 wt.-%, more preferably 40 to 46 wt.-%, still more preferably 41 to 42 wt.-% of $SiO_2$, and at least 18 wt.-%, preferably 18 to 30 wt.-%, more preferably 20 to 24 wt.-%, still more preferably 21 to 23 wt.-% of the at least one alkali metal oxide, based on the overall weight of the composition.

Regarding the at least one alkali metal oxide, the composition may contain any alkali metal source suitable for glass production. Preferably, the composition comprises at least two alkali metal selected from the group consisting of Li, Na and K.

It is especially preferred that the at least one alkali metal oxide within the composition is a mixture of Na and K.

Accordingly, it is preferred that the composition comprises at least 30 wt.-%, preferably 30 to 45 wt.-%, more preferably 33 to 40 wt.-%, still more preferably 35 to 38 wt.-% of $Al_2O_3$, at least 35 wt.-%, preferably 35 to 55 wt.-%, more preferably 40 to 46 wt.-%, still more preferably 41 to 42 wt.-% of $SiO_2$, and at least 18 wt.-%, preferably 18 to 30 wt.-%, more preferably 20 to 24 wt.-%, still more preferably 21 to 23 wt.-% of a mixture of $Na_2O$ and $K_2O$, based on the overall weight of the composition.

Preferably, the weight ratio between $Na_2O$ and $K_2O$ within said mixture is in the range of 10:1 to 30:1, more preferably in the range of 15:1 to 25:1, still more preferably in the range of 18:1 to 22:1, like in the range of 20:1 to 21:1.

Accordingly, it is preferred that the composition comprises, more preferably consists of, at least 30 wt.-%, preferably 30 to 45 wt.-%, more preferably 33 to 40 wt.-%, still more preferably 35 to 38 wt.-% of $Al_2O_3$, at least 35 wt.-%, preferably 35 to 55 wt.-%, more preferably 40 to 46 wt.-%, still more preferably 41 to 42 wt.-% of $SiO_2$, at least 10 wt.-%, preferably 10 to 30 wt.-%, more preferably 15 to 24 wt.-%, still more preferably 18 to 23 wt.-% of $Na_2O$ and at least 0.5 wt.-%, more preferably 0.5 to 5 wt.-%, still more preferably 1.0 to 2.0 wt.-% of $K_2O$, based on the overall weight of the composition.

Further, it is preferred that the composition is free of boron. Regarding the term "free of boron", reference is made to the definition provided above. Accordingly, it is preferred that the composition comprises boron in an amount equal or below 1.0 wt.-%, more preferably equal or below 0.1 wt.-%, still more preferably equal or below 0.01 wt.-%, like equal or below 0.001 wt.-%, based on the overall weight of the composition. Additionally or alternatively, it is preferred that no compounds containing boron are used for the preparation of the composition. The composition is obtained by selecting and if required mixing appropriate sources of $Al_2O_3$, $SiO_2$ and the at least one alkali metal oxide, preferably $Na_2O$ and $K_2O$, in amounts as outlined above.

As outlined above, the starting material for the preparation of the hollow spherical glass particle, i.e. the composition provided in step a) of the inventive process, may be selected from zeolites, clays, mica or mixtures thereof.

Especially for industrial application, the composition provided in step a) may need further grinding. Hence, according to one aspect of the present invention, according to step b) of the inventive process, the composition obtained in step a) is subjected to a grinding process.

As outlined above, the hollow spherical glass particle according to the present invention has a particle size below 100 μm. For obtaining such small particles, it is advantageous that the composition obtained in step a) is grinded to a small particle size in order to obtain a precursor material for the inventive hollow spherical glass particle.

Therefore, the composition in step a) is grinded such that finely ground particles having a particle size of 10 μm or below, preferably of 7.0 μm or below are obtained. More preferably, the particles obtained after the grinding step b) have a particle size equal or below 5.0 μm, still more preferably equal or below 3.0 μm, like equal or below 2.0 μm. The composition can be milled in a ball mill using a suitable grinding medium in order to achieve the desired particle size. Appropriate grinding media are known in the art. The grinding process can be dry or wet.

According to one embodiment of the present invention, it is preferred that the grinded composition obtained in step b) comprises two fractions having different particle sizes. In particular, it is preferred that the first fraction has a particle size in the range of 1.0 to 10.0 μm, preferably in the range of 1.0 to 7.0 μm, more preferably in the range of 2.0 to 5.0 μm, still more preferably in the range of 2.5 to 3.5 μm, like in the range of 2.8 to 3.2 μm, and the second fraction has a particle size equal or below 1.0 μm, preferably equal or below 0.5 μm, more preferably equal or below 0.4 μm, still more preferably equal or below 0.3 μm, like equal or below 0.2 μm.

Preferably, the weight ratio between the first fraction and the second fraction is in the range of 90:10 to 10:90, more preferably in the range of 80:20 to 20:80, still more preferably in the range of 70:30 to 30:70, like in the range of 60:40 to 40:60.

The grinded composition comprising two fractions having different particle sizes as described above can be obtained by preparing the first fraction and the second fraction in separate processes using appropriate grinding media and combining the two fractions in a weight ratio as indicated above.

The finely ground particles optionally obtained in step b) are subsequently mixed with water and optionally an organic binder to obtain a slurry so that the particles have sufficient flowability for the following spray-drying step.

Accordingly, in step c) of the inventive process, the finely ground particles obtained in step b) are mixed with water and optionally an organic binder, thereby obtaining a slurry.

Preferably, said organic binder is a higher hydric alcohol. In particular, it is preferred that said organic binder is selected from the group consisting of glycerin, glycol, xylitol, sorbitol, erythritol, starch, polyvinyl alcohols or mixtures thereof. It is especially preferred that said organic binder is glycerin or glycol.

It is preferred that the slurry comprises up to 80.0 wt.-%, more preferably 40.0 to 80.0 wt.-%, still more preferably 50.0 to 70.0 wt.-%, like 60.0 to 65 wt.-% of the finely ground particles obtained in step b), up to 25.0 wt.-%, more preferably 10.0 to 25.0 wt.-%, still more preferably 12.0 to 23.0 wt.-%, like 15.0 to 20.0 wt.-% of water and up to 25.0 wt.-%, more preferably 1.0 to 25.0 wt.-%, still more preferably 1.5 to 10.0 wt.-%, like 2.0 to 5.0 wt.-% of the organic binder, based on the overall weight of the slurry.

Further, a dispersant may be used in order to assist with mixing, suspending and dispersing the particles. Thus, the slurry may further comprise a dispersant. Preferably, said dispersant is selected from polymeric dispersants such as polyvinyl or polyacryl compounds. In particular, the dispersant is selected from the group consisting of polyvinyl pyrrolidone, polyacrylate, polyacrylate copolymers or mixtures thereof. Non-limiting examples for suitable dispersants are the commercial products Luviskol K90 and Sokalan PA 15 of BASF.

Preferably, the slurry comprises, more preferably consists of, up to 80.0 wt.-%, more preferably 40.0 to 80.0 wt.-%, still more preferably 50.0 to 70.0 wt.-%, like 60.0 to 65 wt.-% of the finely ground particles obtained in step b), up to 25.0 wt.-%, more preferably 10.0 to 25.0 wt.-%, still more preferably 12.0 to 23.0 wt.-%, like 15.0 to 20.0 wt.-% of water, up to 25.0 wt.-%, more preferably 1.0 to 25.0 wt.-%, still more preferably 1.5 to 10.0 wt.-%, like 2.0 to 5.0 wt.-% of the organic binder and up to 2.0 wt.-%, more preferably 0.01 to 2.0 wt.-%, still more preferably 0.1 to 1.5 wt.-%, like 1.0 to 1.3 wt.-% of the dispersant, based on the overall weight of the slurry.

In one preferred embodiment of the present invention, the slurry does not comprise an organic binder.

In step d) of the inventive process, the slurry obtained in step c) is spray-dried. Preferably, the slurry is spray-dried at a temperature in the range of 150 to 250° C.

The thus obtained spray-dried particles are subsequently fed into a heating device in order to obtain the hollow spherical glass particles.

The hollow spherical glass particle according to the present invention has a rather small particle size below 100 μm. Using conventional heating devices wherein the precursor particles obtained from spray-drying the finely ground starting material are fed through the heating device from top to bottom, i.e. such that the particles fall through the heating device, isolating such small particles is often not feasible. Without being bound to theory, the sinking speed of the particles when falling through the heating device is proportional to the square of the particle size. Accordingly, the residence time of finely dispersed small particles in the heating device is longer. Further, small particles are more susceptible towards flow turbulences occurring within the heating device. Therefore, the application of heating devices wherein the precursor particles are fed from top to bottom are more appropriate for the preparation of larger particles.

Therefore, the application of a modified heating device is advantageous in order to obtain the inventive hollow spherical glass particles having a particle size below 100 μm.

According to one embodiment of the present invention, the particles obtained in step d) are fed into a heating device such that the particles are blown upwards while the temperature is maintained above 1000° C., thereby obtaining the hollow spherical glass particles.

More preferably, the temperature in the heating device is in the range of more than 1000 to 1700° C., still more preferably in the range of 1300 to 1400° C.

Preferably, the particles obtained in step d) are blown upwards by means of an upturned drag flow. Without being bound to theory, the flow resistance of the expanded particles is higher which are, therefore, accelerated more within the upturned drag flow due to their larger surface-related flow resistance. Accordingly, the application of a heating device which is passed from bottom to top enables the isolation of small particles in accordance with the present invention.

Preferably, the particles obtained in step d) are passed through the heating device by means of defibrating air.

Further, it is preferred that the carrier gas is nitrogen or air.

Preferably, the volume fraction of solid particles in the carrier gas is below 5.0 vol.-%, more preferably in the range of 0.05 to 1.0 vol.-%, based on the overall volume of the carrier gas. The solid particles are the particles obtained in step d).

According to another embodiment of the present invention, the particles obtained in step d) are fed into a heating system comprising at least two heating devices connected in series such that the particles pass through the first heating device and are continuously transferred into the subsequent heating devices while the temperature in the heating devices is maintained above 1000° C., thereby obtaining the hollow spherical glass particles.

During the heating process, a high number of hollow glass particles is formed which are not fully closed spheres or have inclusions of air within the walls. The mechanical stability of such incompletely formed particles is often poor whereupon the quality of the hollow glass particles is not satisfying. When the hollow glass particles are passed through more than one heating device, the incompletely formed particles become closed spheres and the inclusions in the walls are reduced. Accordingly, the application of more than one heating device improves the mechanical stability of the hollow spherical glass particles.

The at least two heating devices may be heating devices wherein the particles obtained in step d) are passed through from top to bottom or from bottom to top. According to a preferred embodiment of the present invention, at least one of the at least two heating devices is a heating device wherein the particles obtained in step d) are passed through from bottom to top.

Preferably, the particles obtained in step d) are passed through the heating device by means of defibrating air.

Further, it is preferred that the carrier gas is nitrogen or air.

In case the particles are passed through the heating device from bottom to top, the volume fraction of solid particles in the carrier gas is below 5.0 vol.-%, more preferably in the range of 0.05 to 1.0 vol.-%, based on the overall volume of the carrier gas. The solid particles are the particles obtained in step d).

On the other hand, in case the particles are passed through the heating device from top to bottom, the volume fraction of solid particles in the carrier gas is below 10.0 wt.-%, more preferably in the range of 0.1 to 2.0 vol.-%, based on the overall volume of the carrier gas. The solid particles are the particles obtained in step d).

Preferably, at least two heating devices, like three, four or five heating devices connected in series are applied.

For instance, it is preferred that the hollow spherical glass particles are produced in a sequential process comprising the steps of
i) feeding the particles obtained in step d) into a first heating device (H1) while the temperature in the first heating device (H1) is maintained above 1000° C., thereby obtaining a first fraction of hollow spherical glass particles (F1),
ii) feeding the first fraction of hollow spherical glass particles (F1) obtained in step i) into a second heating device (H2) while the temperature in the second heating device (H2) is maintained above 1000° C., thereby obtaining a second fraction of hollow spherical glass particles (F2),
iii) optionally feeding the second fraction of hollow spherical glass particles (F2) obtained in step ii) into a third heating device (H3) while the temperature in the third heating device (H3) is maintained above 1000° C., thereby obtaining a third fraction of hollow spherical glass particles (F3), and
iv) optionally feeding the third fraction of hollow spherical glass particles (F3) obtained in step iii) into a fourth heating device (H4) while the temperature in the fourth heating device (H4) is maintained above 1000° C., thereby obtaining a fourth fraction of hollow spherical glass particles (F4),
    said first, second, third and fourth fraction of hollow spherical glass particles (F1) and (F2) and optionally (F3) and (F4) forming the hollow spherical glass particles.

It is preferred that the first heating device (H1) and/or the second heating device (H2) is/are a heating device wherein the particles obtained in step d) are passed through from bottom to top.

Preferably, the temperature in the heating devices is in the range of more than 1000 to 1700° C., more preferably in the range of 1300 to 1400° C. The temperatures in the heating devices such as the first, second, third and fourth heating device, may be different or identical.

Further, it is preferred that the particle flow between the at least two, like three, four or five heating devices is fed through a mixing device.

According to a further embodiment of the present invention, the particles obtained in step d) are fed into at least one heating device such that the particles pass through the heating device while the temperature in the heating devices is maintained above 1000° C. and at least a part of the thus obtained particles is transferred back into the heating device such that the particles pass through the heating device, thereby obtaining the hollow spherical glass particles.

Preferably, the particles obtained in step d) are passed through the heating device by means of defibrating air.

Further, it is preferred that the carrier gas is nitrogen or air.

In case the particles are passed through the heating device from bottom to top, the volume fraction of solid particles in the carrier gas is below 5.0 vol.-%, more preferably in the range of 0.05 to 1.0 vol.-%, based on the overall volume of the carrier gas. The solid particles are the particles obtained in step d).

On the other hand, in case the particles are passed through the heating device from top to bottom, the volume fraction of solid particles in the carrier gas is below 10.0 wt.-%, more preferably in the range of 0.1 to 2.0 vol.-%, based on the overall volume of the carrier gas. The solid particles are the particles obtained in step d).

The at least one heating device may be a heating device wherein the particles obtained in step d) are passed through from top to bottom or from bottom to top.

At least a partial flow of particles is transferred from the outlet of the heating device to the inlet of the heating device such that said partial flow of particles is passed through the heating device one more time while the temperature in the heating device is maintained above 1000° C.

Preferably, said partial flow of particles contains at least 20 wt.-% of the particles obtained after the first pass of the particles obtained in step d) through the heating device, more preferably at least 50 wt.-%, still more preferably at least 80 wt.-%, like at least 90 wt.-%. According to one embodiment of the present invention, the partial flow contains the entire particles obtained after the first pass of the particles obtained in step d) through the heating device.

As indicated above, a high number of hollow glass particles which are not fully closed spheres or have inclusions of air within the walls is formed during the heating process which has a detrimental effect on the mechanical stability of the particles. When the hollow glass particles are passed through the heating device repeatedly, the incompletely formed particles become closed spheres and the inclusions in the walls are reduced.

According to a preferred embodiment of the present invention, the partial flow of particles which is transferred from the outlet of the heating device to the inlet of the heating device such that said partial flow of particles is passed through the heating device one more time is mostly composed of particles which are not fully closed spheres or have inclusions of air within the walls. Accordingly, it is preferred that said particles which are not fully closed spheres or have inclusions of air within the walls are separated from the particles obtained after the first pass of the particles obtained in step d) through the heating device. Preferably, the heating device comprises a fractioning device downstream the outlet of the heating device.

The partial flow of particles is passed through the heating device one more time. In other words, the particles of the partial flow pass the heating device a second time. After the second pass of the particles of the partial flow, a second partial flow of particles may be transferred from the outlet of the heating device to the inlet of the heating device such that said partial flow of particles is passed through the heating device one more time while the temperature in the heating device is maintained above 1000° C.

Preferably, said second partial flow of particles contains at least 20 wt.-% of the particles obtained after the second pass of the particles through the heating device, more preferably at least 50 wt.-%, still more preferably at least 80 wt.-%, like at least 90 wt.-%. According to one embodiment of the present invention, the partial flow contains the entire particles obtained after the second pass of the particles through the heating device.

After the second pass of the particles through the heating device, a third partial flow of particles may be transferred from the outlet of the heating device to the inlet of the heating device such that said partial flow of particles is passed through the heating device one more time while the temperature in the heating device is maintained above 1000° C.

Thus, it is preferred that at least a partial flow of particles is passed through the heating device at least two times, like two, three or four times. The respective partial flows are partial flows of the previous partial flows. In particular, it is preferred that the respective partial flows contain at least 20 wt.-% of the previous partial flow, more preferably at least 50 wt.-%, still more preferably at least 80 wt.-%, like at least 90 wt.-% of the previous partial flow. According to one embodiment of the present invention, the respective partial flows contain the entire particles of the previous partial flows.

For instance, it is preferred that the hollow spherical glass particles are produced in a sequential process comprising the steps of i) feeding the particles obtained in step d) into a heating device (H) while the temperature in the heating device (H) is maintained above 1000° C., thereby obtaining a first fraction of hollow spherical glass particles (F1'), ii) transferring at least a first partial flow (P1) of the first fraction of hollow spherical glass particles (F1') from the outlet of the heating device to the inlet of the heating device such that said first partial flow of particles is passed through the heating device one more time while the temperature in the heating device (H) is maintained above 1000° C. wherein the first partial flow preferably contains at least 20 wt.-% of the previous partial flow, more preferably at least 50 wt.-%, still more preferably at least 80 wt.-%, like at least 90 wt.-%, of the first fraction of hollow spherical glass particles (F1') obtained in step i), thereby obtaining a second fraction of hollow spherical glass particles (F2'), iii) optionally transferring at least a second partial flow (P2) of the second fraction of hollow spherical glass particles (F2') from the outlet of the heating device to the inlet of the heating device such that said partial flow of particles is passed through the heating device one more time while the temperature in the heating device (H) is maintained above 1000° C. wherein the second partial flow preferably contains at least 20 wt.-% of the previous partial flow, more preferably at least 50 wt.-%, still more preferably at least 80 wt.-%, like at least 90 wt.-%, of the second fraction of hollow spherical glass particles (F2') obtained in step ii), thereby obtaining a third fraction of hollow spherical glass particles (F3'), and iv) optionally transferring at least a third partial flow (P3) of the third fraction of hollow spherical glass particles (F3') from the outlet of the heating device to the inlet of the heating device such that said partial flow of particles is passed through the heating device one more time while the temperature in the heating device (H) is maintained above 1000° C. wherein the third partial flow preferably contains at least 20 wt.-% of the previous partial flow, more preferably at least 50 wt.-%, still more preferably at least 80 wt.-%, like at least 90 wt.-%, of the third fraction of hollow spherical glass particles (F3') obtained in step iii), thereby obtaining a fourth fraction of hollow spherical glass particles (F4'), wherein the heating device optionally comprises a fractioning device downstream the outlet of the heating device.

Preferably, the temperature in the heating device is in the range of more than 1000 to 1700° C., still more preferably in the range of 1300 to 1400° C.

Further, it is preferred that the heating device comprises a mixing device downstream the outlet of the heating device.

As outlined above, the present invention is further directed to an article, comprising the plurality of hollow spherical glass particles as described above.

Preferably, the article comprises at least 5.0 wt.-%, more preferably at least 20.0 wt.-%, still more preferably at least 40.0 wt.-%, like at least 60.0 wt.-% of the plurality of hollow spherical glass particles.

In particular, it is preferred that the article is a high temperature product, an injection moulded synthetic material, a flame-retardant insulating foam, a cement slurry, a mortar or concrete.

Further, the present invention is also directed to the use of the plurality of hollow spherical glass particles as described above as a filler for high temperature products, molten metal, injection moulded synthetic materials, flame-retardant insulating foams, cement slurries, mortars, concretes and oil field applications.

Embodiments of the present invention are further illustrated by the following non-limiting examples, which are not to be construed in any way as imposing limitations upon the scope thereof. It should be appreciated by those of skill in the art that the techniques disclosed in the Examples which follow represent techniques discovered to function well in the practices disclosed herein, and thus can be considered to constitute preferred modes for its practice. However, those of skill in the art should, in light of the present disclosure, appreciate that many changes can be made in the specific embodiments which are disclosed and sill obtain a like or similar result without departing from the spirit and scope herein.

EXAMPLES

The bulk density was determined in a glass tube, having an inner diameter of 2.5 mm and a length of 100 mm. The applied glass tube had a volume of 0.49 ml. The weight of the empty and the filled glass tube was determined via analytical balance. The bulk density was calculated by dividing the therewith determined difference by the volume of the glass tube. A low value represents a loosen fill, whereas a high value represents a compact fill.

For the microscopy, a Leica-Leitz, Laborlux 12HL was used.

The sieving was conducted with a tumbler screening machine (Allgaier VTS600) with ultrasound assistance.

Zeolite A (ZP-4A, purchased at Silkem VertriebsAG) and kaolin (purchased at Stephan, Burbach) used had a primary particle size of from 3 to 10 μm.

Figure 1:
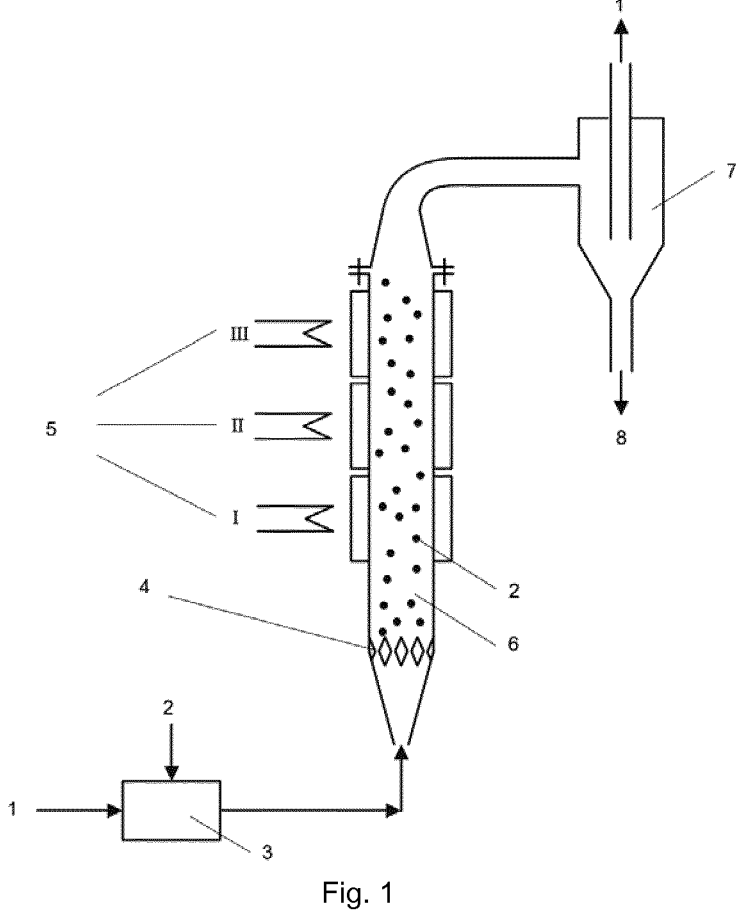
FIG. 1 (FIG. 1) depicts a pilot plant, comprising a gas stream (1), a dosing unit (3), a distributor unit having a perforated, double-tapered plate (4), three heating zones (5), a tube furnace, having a ceramic tube, heated from the outside (6), a separator (7), and a separator good collector (8). The particles (2) are lead through the pilot plant.

The process was conducted in a pilot plant according to FIG. 1.

In a gas stream (1), the particles (2) (i.e. the respective particle size fractions each) can be added with a dosing unit (3) from the bottom to a vertical, multistage heated tube furnace (6) as heating device, having a cyclone separator (7) with centrifugal properties. The cyclone separator separates the particles, which will be collected in a separator good collector (8). The gas stream (1) is lead over the exhaust system into the atmosphere. The tube furnace (6) comprises an oxide ceramic tube (aluminum oxide) with an inner diameter of 78 mm and a length of 1000 mm. The tube is heated from the outside by three different heating zones (5) over the tube length. A maximum temperature of 1800° C. may be achieved. The length of the individual heating zones is 250 mm. The temperature within the heating zones (5) is individually adjustable. However, the temperature difference between two heating zones should not exceed 150° C., as otherwise mechanical problems may occur to the oxide ceramic tube. To achieve a consistent gas particle flow at the bottom entrance of the tube, a distributor unit is installed. The distributor unit is a thick ceramic perforated plate, wherein the holes are performed double-tapered (4). Thus, no particles are precipitated before the plate and no flow separation occurs at the outlet.

Steps a) to d):

Na$_2$CO$_3$ (28 wt.-%) was dissolved in water in a 10 ltr stirring tank. Zeolite A (60 wt.-%) and kaolin (12 wt.-%) were premixed and then added via a funnel to the 10 ltr stirring tank. The slurry, containing enough water, so that the slurry could only just be pumped into the spray tower, was agitated for 1 hour.

The spray-dried precursor material, obtained in step d) of the inventive process, was first divided into two different particle size fractions (fine precursor fraction <80 μm and gross precursor fraction >80 μm) by sieving.

The fine precursor fraction was further classified and divided into four particle size fractions.

<20 μm 20-40 μm 40-63 μm 63-80 μm

The fraction <20 μm was discarded.

A sieve cloth according to DIN ISO 9044 was applied, thereby using a stainless steel mesh.

The Examples were performed with the respective fine precursors.

Example 1: 20-40 μm

Settings:

80 ltr/min air at ambient temperature, between 22 to 26° C.

2.4 g/min precursor

Heating zone I 1750° C.

Heating zone II 1600° C.

Heating zone III 1450° C.

The particles, transported through the furnace were collected in the separator and weighed after cooling. Under the microscope, is was clearly visible that not all precursors were bloated ideally. The complete separator good was subjected to a flotation with a liquid fluid (acetone), having the density of 780 kg/m$^3$. Thereby, all particles that were not bloated and opened precipitated. The desired bloated particles floated on the surface. The bloated particles were dried and weighed again.

The process was conducted for a duration of six hours. 10.35 g of separator good in the separator was collected. After the flotation separation, 2.88 g of intact hollow spherical glass particles were obtained. This corresponds to a mass fraction of 0.278 with regard to the mass of the separator good.

The intact hollow spherical glass particles had a dimension of 23-45 μm, determined by a microscope. The bulk density was 0.65-0.7 g/cm$^3$.

Example 2: 40-63 μm

Settings:

55 ltr/min air at ambient temperature, between 22 to 26° C.

2.4 g/min precursor

Heating zone I 1720° C.

Heating zone II 1650° C.

Heating zone III 1500° C.

Figure 2:
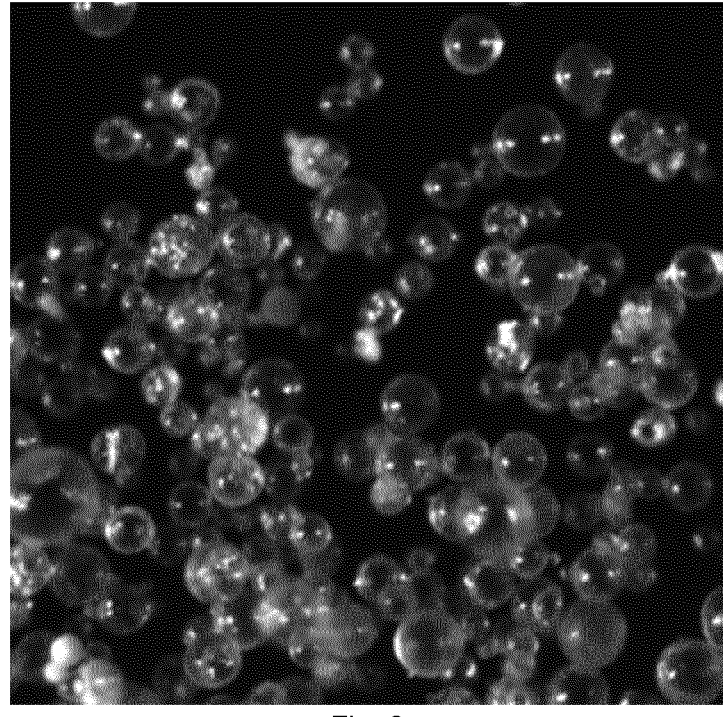
FIG. 2 (FIG. 2) depicts the microscopic picture of the particle mixture after separator good collection.

The particles, transported through the furnace were collected in the separator and weighed after cooling. Under the microscope (FIG. 2), is was clearly visible that not all precursors were bloated ideally. The complete separator good was subjected to a flotation with a fluid, having the density of 780 kg/m$^3$. Thereby, all particles that were not bloated and opened precipitated. The desired bloated particles floated on the surface. The bloated particles were dried and weighed again (FIG. 3).

The process was conducted for a duration of six hours. 10.52 g of separator good in the separator was collected. After the flotation separation, 3.13 g of intact hollow spherical glass particles were obtained. This corresponds to a mass fraction of 0.298 with regard to the mass of the separator good.

The intact hollow spherical glass particles had a dimension of 43-48 μm, determined by a microscope. The bulk density was 0.62-0.67 g/cm$^3$.

Example 3: 63-80 μm

Settings:

40 ltr/min air at ambient temperature, between 22 to 26° C.

2.4 g/min precursor

Heating zone I 1700° C.

Heating zone II 1650° C.

Heating zone III 1500° C.

The particles, transported through the furnace were collected in the separator and weighed after cooling. Under the microscope, is was clearly visible that not all precursors were bloated ideally. The complete separator good was subjected to a flotation with a fluid, having the density of 780 kg/m$^3$. Thereby, all particles that were not bloated and opened precipitated. The desired bloated particles floated on the surface. The bloated particles were dried and weighed again.

The process was conducted for a duration of six hours. 10.81 g of separator good in the separator was collected. After the flotation separation, 3.62 g of intact hollow spherical glass particles were obtained. This corresponds to a mass fraction of 0.335 with regard to the mass of the separator good.

The intact hollow spherical glass particles had a dimension of 65-90 μm, determined by a microscope. The bulk density was 0.58-0.63 g/cm$^3$.

The intact hollow spherical glass particles may systematically be sieved to obtain the desired particle size. Thus, in a next step, the intact hollow spherical glass particles may be separated by sieving into two fractions, wherein one fraction has a particle size of 65-75 μm and the other fraction has a particle size of 75-90 μm.

COMPARATIVE EXAMPLES

For the Comparative Example, the same tube furnace was used. However, the precursor material was added with a dosing unit from the top with a small amount of air and the precursor particles fell due to gravity from the top to the bottom trough the furnace. The small amount of air was used for even distribution solely.

Comparative Example 1: 125-175 μm

The particle size fraction of 125-175 μm turned out to be the best variant for this furnace arrangement (three heating zones, each having 250 mm length, 78 mm inner diameter, 1000 mm tube length). The precursor particles fell with an average speed of about 0.3 m/s through the tube to the bottom and had a mean residence time of 2.5 sec in the heating zone. This was sufficient enough to melt the surface of the particles and achieve the necessary surface film for the mechanism of the diffuse material exchange of the steam from the inner to the outer and the reversed oven purge gas from the outer to the inner of the particles.
Settings:

10 ltr/min air at ambient temperature, between 22 to 26° C., for the dispersion of the particles
    2.4 g/min precursor
    Heating zone I 1500° C.
    Heating zone II 1650° C.
    Heating zone III 1700° C.

The particles, which fell through the tube furnace from the top to the bottom, were collected at the bottom of the tube furnace and weighed after cooling. Under the microscope, is was clearly visible that not all precursor particles were bloated ideally. The complete separator good was subjected to a flotation with a fluid, having the density of 780 kg/m³. Thereby, all particles that were not bloated and opened precipitated. The desired bloated particles floated on the surface. The bloated particles were dried and weighed again.

The process was conducted for a duration of six hours. 10.9 g of separator good was collected. After the flotation separation, 3.9 g of intact hollow spherical glass particles were obtained. This corresponds to a mass fraction of 0.36 with regard to the mass of the separator good.

The intact hollow spherical glass particles had a dimension of 130-190 μm, determined by a microscope. The bulk density was 0.48-0.53 g/cm³.

Comparative Example 2: 80-125 μm

The particle size fraction of 80-125 μm was allow to fall through the furnace arrangement (three heating zones, each having 250 mm length, 78 mm inner diameter, 1000 mm tube length), as well. The precursor particles fell with an average speed of about 0.13 m/s through the tube to the bottom and had a mean residence time of 5.9 sec in the heating zone.
Settings:

10 ltr/min air at ambient temperature, between 22 to 26° C., for the dispersion of the particles
    2.4 g/min precursor
    Heating zone I 1500° C.
    Heating zone II 1650° C.
    Heating zone III 1700° C.

The particles, which fell through the tube furnace from the top to the bottom, were collected at the bottom of the tube furnace and weighed after cooling. Under the microscope, is was clearly visible that not all precursor particles were bloated ideally. The complete separator good was subjected to a flotation with a fluid, having the density of 780 kg/m³. Thereby, all particles that were not bloated and opened precipitated. The desired bloated particles floated on the surface. The bloated particles were dried and weighed again.

The process was conducted for a duration of six hours. 10.7 g of separator good was collected. After the flotation separation, 1.2 g of intact hollow spherical glass particles were obtained. This corresponds to a mass fraction of 0.11 with regard to the mass of the separator good. The intact hollow spherical glass particles had a dimension of 85-132 μm, determined by a microscope. The bulk density was 0.5-0.55 g/cm³.

The microscopic picture discloses a large portion of non-bloated particles. Without being bound to any theory, it is suspected that the residence time in the free fall is too high so that the precursor particles fuse immediately and that these particles do not have the chance to bloat.

Comparative Example 3: 63-80 μm

The particle size fraction of 63-80 μm was allowed to fall through the furnace arrangement (three heating zones, each having 250 mm length, 78 mm inner diameter, 1000 mm tube length), as well. The precursor particles fell with an average speed of about 0.063 m/s through the tube to the bottom and had a mean residence time of 11.9 sec in the heating zone.
Settings:

10 ltr/min air at ambient temperature, between 22 to 26° C., for the dispersion of the particles
    2.4 g/min precursor
    Heating zone I 1500° C.
    Heating zone II 1650° C.
    Heating zone III 1700° C.

The particles, which fell through the tube furnace from the top to the bottom, were collected at the bottom of the tube furnace and weighed after cooling. Under the microscope, is was clearly visible that not all precursor particles were bloated ideally. The complete separator good was subjected to a flotation with a fluid, having the density of 780 kg/m³. Thereby, all particles that were not bloated and opened precipitated. The desired bloated particles floated on the surface. The bloated particles were dried and weighed again.

The process was conducted for a duration of six hours. 10.4 g of separator good was collected. After the flotation separation, 0.14 g of intact hollow spherical glass particles were obtained. This corresponds to a mass fraction of 0.013 with regard to the mass of the separator good. The intact hollow spherical glass particles had a dimension of 65-90 μm, determined by a microscope. The bulk density was 0.55-0.60 g/cm³.

The microscopic picture discloses solely non-bloated particles. This is yet another indication to support the theory that the residence time in the free fall is too high.

Comparison of Example 3 with Comparative Example 3

According to Example 3, the particle size fraction of 63-80 μm was transported through the tube furnace from the bottom to the top, as described above. The residence time in Example 3 was adjusted with a gas/air stream to about 1-1.2 sec. Due to the gas/air stream, which streams nearby the inner wall, caking of the particles on the inner wall is prevented. Following this setup, a mass fraction of 0.335 of bloated particles was obtained in Example 3.

In Comparative Example 3 the particles are allowed to fall from the top to the bottom. The utilization of a closed apparatus is not applicable, as the particles will deposit on the inner wall. To obtain any results for a setup, wherein the particles are allowed to fall from the top to the bottom, the apparatus has to be opened on the top. Thus, a preheated gas/air stream can be supplied lateral from the bottom, which then is allowed to stream along the inner wall to the top and exit. The precursor particles are added to the furnace from the top with a small amount of air. Particles, having a particle size of 63 to 80 μm turned out to have a residence time of about 11.9 sec. Hence, the particles fused and were not bloated. In contrast to Example 3, in Comparative Example 3, only a mass fraction of 0.013 of bloated particles was obtained.

The Examples support the theory, that the particles obtained by an upturned drag flow is superior in order to obtain small particles compared to the process wherein the particles are introduced in the tube furnace from the top.

The invention claimed is:

1. A process for the preparation of hollow spherical glass particles, comprising the steps of
   a) providing a composition comprising
      i) at least 30 wt.-% of $Al_2O_3$,
      ii) at least 35 wt.-% of $SiO_2$, and
      iii) at least 18 wt.-% of at least one alkali metal oxide, based on the overall weight of the composition,
   b) mixing the composition obtained in step a) with water, thereby obtaining a slurry,
   c) spray-drying the slurry obtained in step b), thereby obtaining spray-dried particles and
   d) feeding the spray-dried particles obtained in step c) into a heating system to obtain the hollow spherical glass particles, wherein the heating system comprises at least one heating device where in one or more of the at least one heating devices the particles are blown upwards while the temperature is maintained above 1000° C.;
   wherein the spray-dried particles fed into the heating system in step d) have a particle size of at or below 80 μm, and
   wherein a carrier gas stream flow rate used to blow the particles upward in step d) is from 40 L/min to 80 L/min.

2. The process according to claim 1, wherein in step b) the composition obtained in step a) are further mixed with an organic binder.

3. The process according to claim 2, wherein said organic binder is a hydric alcohol.

4. The process according to claim 2, wherein the organic binder is selected from the group consisting of glycerin, glycol, xylitol, sorbitol, erythritol, starch, polyvinyl alcohols, or mixtures thereof.

5. The process according to claim 1, wherein the composition obtained in step a) is additionally subjected to a grinding process such that finely ground particles having a particle size of 10.0 μm or below are obtained, and wherein the grinding process is carried out prior to the mixing with water in step b).

6. The process according to claim 5, wherein the finely ground particles comprise a first fraction of particles having a particle size in the range of 1.0 to 10 μm, and a second fraction of particles having a particle size of 1.0 μm or below.

7. The process according to claim 6, wherein weight ratio of the first fraction to the second fraction is in the range of 80:20 to 20:80.

8. The process according to claim 5, wherein the finely ground particles comprise a first fraction of particles having a particle size in the range of 1.0 to 7.0 μm and a second fraction of particles having a particle size of 1.0 μm or below.

9. The process according to claim 1, wherein step a) is
   a) providing a composition comprising
      i) at least 30 wt.-% of $Al_2O_3$,
      ii) at least 35 wt.-% of $SiO_2$, and
      iii) at least 18 wt.-% of at least two alkali metal oxides, based on the overall weight of the composition.

10. The process according to claim 1, wherein the hollow spherical particles have a particle diameter in the range of 20 to 75 μm.

11. The process according to claim 1, wherein the hollow spherical particles have a ratio between the particle diameter [in μm] and the wall thickness [in μm] is in the range of 10 to 30.

12. The process according to claim 1, wherein the hollow spherical particles have a wall thickness in the range 0.1 to 15 μm.

13. The process according to claim 1, wherein the hollow spherical glass particles have a pressure collapse strength value in the range of 120 to 150 MPa.

14. The process according to claim 1, wherein the spray-dried particles fed into the heating system in step d) have a particle size in the range of 20 to 80 μm.

15. The process according to claim 1, wherein the hollow spherical particles have a particle diameter of at or below 75 μm.

16. The process of claim 1, wherein the heating system comprises at least two heating devices connected in series such that the particles pass through the first heating device and are continuously transferred into the subsequent heating devices while the temperature in the heating devices is maintained above 1000° C.

17. The process of claim 1, wherein the heating system comprises at least one heating device such that the particles passthrough the at least one heating device while the temperature in the at least one heating device is maintained above 1000° C. and at least a part of the thus obtained particles is transferred back into the at least one heating device such that the transferred particles pass through the at least one heating device again.

18. The process of claim 1, wherein at least one heating device comprises a tube furnace having an oxide ceramic tube heated from outside the oxide ceramic tube, and three different heating zones, wherein the temperature difference between two adjacent heating zones does not exceed 150° C.

19. The process of claim 1, wherein the mass fraction of the hollow spherical glass particles is from 0.278 to 0.335, relative to the mass of all of the collected particles from the process.

20. The process of claim 1, wherein the mass fraction of the hollow spherical glass particles is greater than 0.27, relative to the mass of all of the collected particles from the process.

21. The process of claim 1, wherein the composition provided in step a) is 28 wt.-% $Na_2CO_3$, 60 wt.-% Zeolite A, and 12 wt.-% kaolin, based on the overall weight of the composition.

* * * * *